US008612849B2

(12) United States Patent
Boreham et al.

(10) Patent No.: US 8,612,849 B2
(45) Date of Patent: Dec. 17, 2013

(54) LAYING OUT GRAPHICAL ELEMENTS ON A PAGE

(75) Inventors: Ian Robert Boreham, Gordon (AU); Allen Peter Courtney, Brooklyn (AU); David Grant McLeish, Wentworthville (AU)

(73) Assignee: Canon Kabushiki Kaisha, Tokyo (JP)

( * ) Notice: Subject to any disclaimer, the term of this patent is extended or adjusted under 35 U.S.C. 154(b) by 1412 days.

(21) Appl. No.: 12/058,000

(22) Filed: Mar. 28, 2008

(65) Prior Publication Data

US 2008/0256439 A1 Oct. 16, 2008

(30) Foreign Application Priority Data

Apr. 13, 2007 (AU) ................................ 2007201652

(51) Int. Cl.
*G06F 17/00* (2006.01)
(52) U.S. Cl.
USPC ........... 715/243; 715/244; 715/245; 715/246; 715/247
(58) Field of Classification Search
USPC .................................. 715/243–247
See application file for complete search history.

(56) References Cited

U.S. PATENT DOCUMENTS

| 5,796,401 A | 8/1998 | Winer |
| 6,356,279 B1 | 3/2002 | Halstead, Jr. et al. |
| 6,504,544 B1 * | 1/2003 | Hollingsworth et al. ...... 345/467 |
| 6,667,750 B1 * | 12/2003 | Halstead et al. ............... 715/788 |
| 7,107,525 B2 * | 9/2006 | Purvis ............................ 715/244 |
| 7,243,303 B2 * | 7/2007 | Purvis et al. ................... 715/253 |
| 7,409,635 B2 * | 8/2008 | Epstein .......................... 715/243 |
| 7,487,445 B2 * | 2/2009 | Purvis et al. ................... 715/249 |
| 7,750,924 B2 * | 7/2010 | Berker et al. .................. 345/619 |
| 7,788,579 B2 * | 8/2010 | Berkner et al. ................ 715/243 |
| 7,814,414 B2 * | 10/2010 | Marks et al. ................... 715/243 |
| 7,856,596 B2 * | 12/2010 | Crider et al. ................... 715/243 |
| 2004/0205472 A1 * | 10/2004 | Purvis ............................ 715/500 |
| 2005/0055635 A1 * | 3/2005 | Bargeron et al. .............. 715/525 |
| 2007/0003139 A1 | 1/2007 | Gotoh et al. |

FOREIGN PATENT DOCUMENTS

| JP | 8-044883 | 2/1996 |
| JP | 2000-134458 | 5/2000 |
| JP | 2007-013550 | 1/2007 |
| WO | WO 01/09834 | 2/2001 |

\* cited by examiner

*Primary Examiner* — Stephen Hong
*Assistant Examiner* — Matthew Ludwig
(74) *Attorney, Agent, or Firm* — Fitzpatrick, Cella, Harper & Scinto

(57) ABSTRACT

Disclosed are methods for laying out objects on a page which may be operative at a pre-layout calculation stage (107) or a post-layout calculation stage (109). The methods involve objects such as panels (202) into which multiple containers (203) may be configured to negotiate for space within the panel (202) upon insertion of content (204) into the panels. Typically some of the content (204) is variable for each instance of document production according to the layout. The laying out involves the application of multiple arrangement rules (FIGS. 5A-5D) and arbitration between preferred and actual dimensions (eg. height and width) of the objects including panels and containers.

27 Claims, 14 Drawing Sheets

Base preferred size

Proportionality 0.0

Proportionality 0.5

Proportionality 1.0

Preferred sizes ( proportionality 1.0)

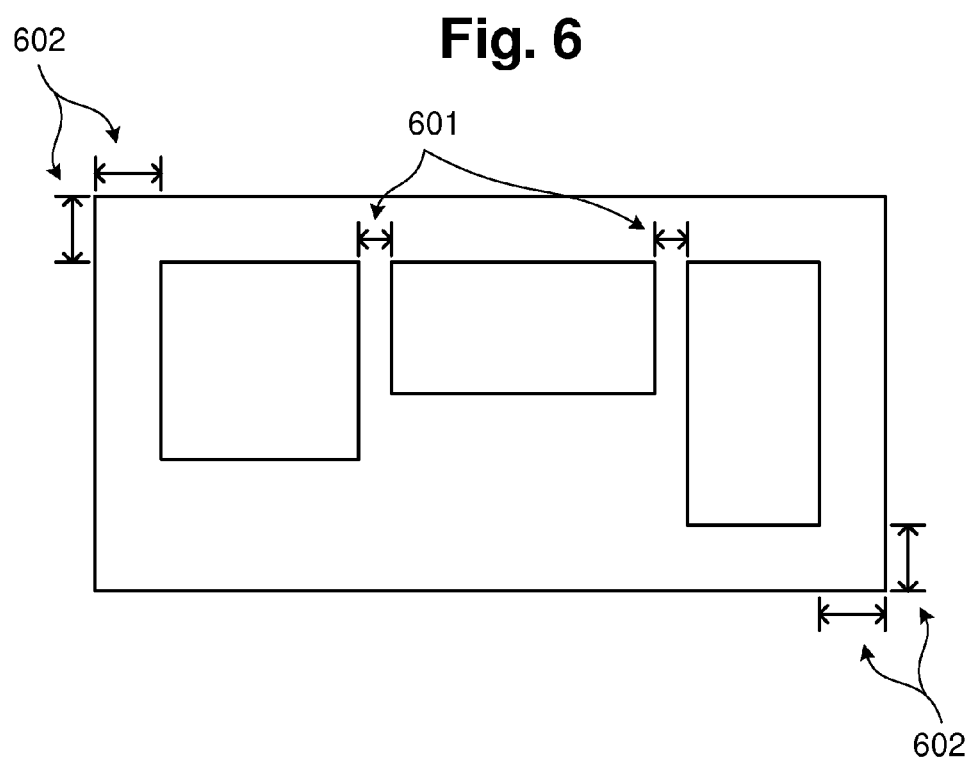

LAYING OUT GRAPHICAL ELEMENTS ON A PAGE

CROSS-REFERENCE TO RELATED PATENT APPLICATIONS

This application claims the right of priority under 35 U.S.C. §119 based on Australian Patent Application No. 2007201652, filed Apr. 13, 2007, which is incorporated by reference herein in its entirety as if fully set forth herein.

TECHNICAL FIELD OF INVENTION

The present invention deals with document layout and in particular with efficient and flexible methods of laying out graphical elements on a page.

RELATED BACKGROUND ART

Page layout is the art of positioning graphical elements, such as text and graphics objects, on the page with the aim of creating a desired aesthetic effect.

In order to realise a certain aesthetic effect, the document author will want to retain control over most aspects of page layout. However, there are some circumstances under which a certain degree of automated layout, within specified constraints, is of great benefit.

Variable Data Printing, or VDP, is an example of a class of application that benefits from constraint-based automatic layout. VDP allows for the printing of a large number of documents, each of which contains text and graphics objects that have been customised to the document's recipient (so-called variable text and graphics objects).

A VDP document begins with a template containing static text and graphics. The document author then adds placeholders that define how content elements, such as variable text and graphics objects, are to be selected and laid out.

A container defines an area on a page that can hold display content elements, such as images, text, or other media elements. Containers have a size and position that can be fixed, or can vary by negotiating for space with other containers. A container's bounds are not necessarily confined to the printable area of the page. A straight line segment of the border of a container is referred to as an edge.

An edge can either be either fixed or movable. A fixed edge is constrained to an absolute position on the page. A movable edge has a position that can change according to the placed elements and the rules of the containers.

Multiple elements may used in the layout. These elements may vary in size and proportion. Without constraint-based automatic layout, each element would be assigned to a container with fixed edges. However, this inflexible approach can lead to an inappropriate amount of space being allocated in many instances.

For example, two adjacent containers of the same size could be occupied by images with greatly differing sizes, leading to the larger image being scaled down and the smaller image failing to fill its space. This can also lead to undesired space around and between elements, due to the actual element differing in aspect ratio from the allocated container. Better results may be obtained if the neighbouring containers are able to negotiate with each other to determine the best area to allocate to each container. Such negotiation is typically carried out by an automatic layout process using the constraints and the element properties.

Often a layout contains groups of elements which are arranged in some pattern. For example, a row of images might be aligned so that the top and bottom of each image lie along the same line; or they might all have the same width. These designs can best be achieved by treating the group as a single element, and dividing up the container space among the elements internally after laying out the container for the group.

There are other (non-VDP) applications which nevertheless are template based. Templates are very good at defining precise layouts, into which content may be added. However, it is desirable to define a template which defines a general appearance, but allows the flexible use of different numbers and size of elements. This would allow multiple documents to be produced with a similar appearance from a single template. Such an approach can also free the document author from some tedious aspects of manually balancing elements against each other.

Arising from the scenarios described above is desire for a mechanism to set constraints and properties to allow group containers to negotiate with each other and with other containers to determine the size of each container, according to the properties of the contained elements.

Some previous solutions have involved the creation of single layout elements, and have given the user some way to specify constraints between them. This makes it difficult to design layouts that treat a collection of elements as a group, and apply similar layout constraints to all of them consistently. Additionally, this approach can not be used to create documents with different numbers of document elements from the same template.

Other previous solutions have offered a mechanism to include multiple elements within a single container, but have limited layout capabilities. For example, some solutions, such as that described in International Patent Publication No. WO 2001009834 (Curl), allow multiple elements to be arranged in a single container, but do not have the ability to adjust both the horizontal and vertical sizes simultaneously—only one of those dimensions can depend on the other, which places limits on its ability to successfully arrange elements that, for example, have a preferred relationship between width and height.

SUMMARY OF INVENTION

In accordance with one aspect of the present disclosure there is provided a method of laying out objects on a page, each said object having a preferred height and a preferred width, said method comprising:

(a) arranging a first plurality of said objects within a first panel according to a first arrangement rule;

(b) calculating the preferred height of the first panel, based on the preferred width of at least one of the first plurality of said objects;

(c) arranging a second plurality of said objects within a second panel according to a second arrangement rule;

(d) calculating the preferred width of the second panel, based on the preferred height of at least one of the second plurality of said objects;

(e) laying out the panels within the page, thereby determining the actual width and height of each panel, based on the preferred height and width of each panel; and (f) laying out the objects within each panel thereby determining the actual width and height of each object based on the determined actual width and height of each panel and the respective arrangement rules.

In accordance with another aspect of the present disclosure there is provided a method of laying out objects on a page, said method comprising:

(a) arranging a plurality of objects within a first panel according to a first arrangement rule;

(b) arranging a plurality of objects within a second panel according to a second arrangement rule;

(c) laying out the panels within the page, thereby determining the actual width and height of each panel;

(d) calculating the actual height of at least one object within the first panel according to the first arrangement rule, based on the actual width of the first panel; and (e) calculating the actual width of at least one object within the second panel according to the second arrangement rule, based on the actual height of the second panel.

The first arrangement rule may comprise one of an equal spacing horizontal rule and an aspect ratio vertical rule. The second arrangement rule comprises one of an aspect ratio horizontal rule and an equal spacing vertical rule. The aspect ratio horizontal rule preferably comprises the preferred width of the panel depending on the preferred height of the objects. The equal spacing horizontal rule preferably comprises the preferred height of the panel depending on the preferred width of the objects.

Numerous other aspect of the disclosure are provided as summarised by the claims and these further include computer programs for performing the methods and apparatus for implementing the method and programs.

BRIEF DESCRIPTION OF THE DRAWINGS

At least one embodiment of the present invention will now be described with reference to the drawings in which:

FIG. 6 is an illustration of the positioning of document elements within a panel;

DETAILED DESCRIPTION INCLUDING BEST MODE

Described are arrangements that aim to provide a way to group and arrange document objects (used hereafter as synonymous with "elements" as previously defined, encompassing text and graphics including image) within containers or panels adapted to be laid out on a page, so that the space given to each container is affected by the preferred size of its document objects, while arranging those objects aesthetically within their container.

Figure 1:
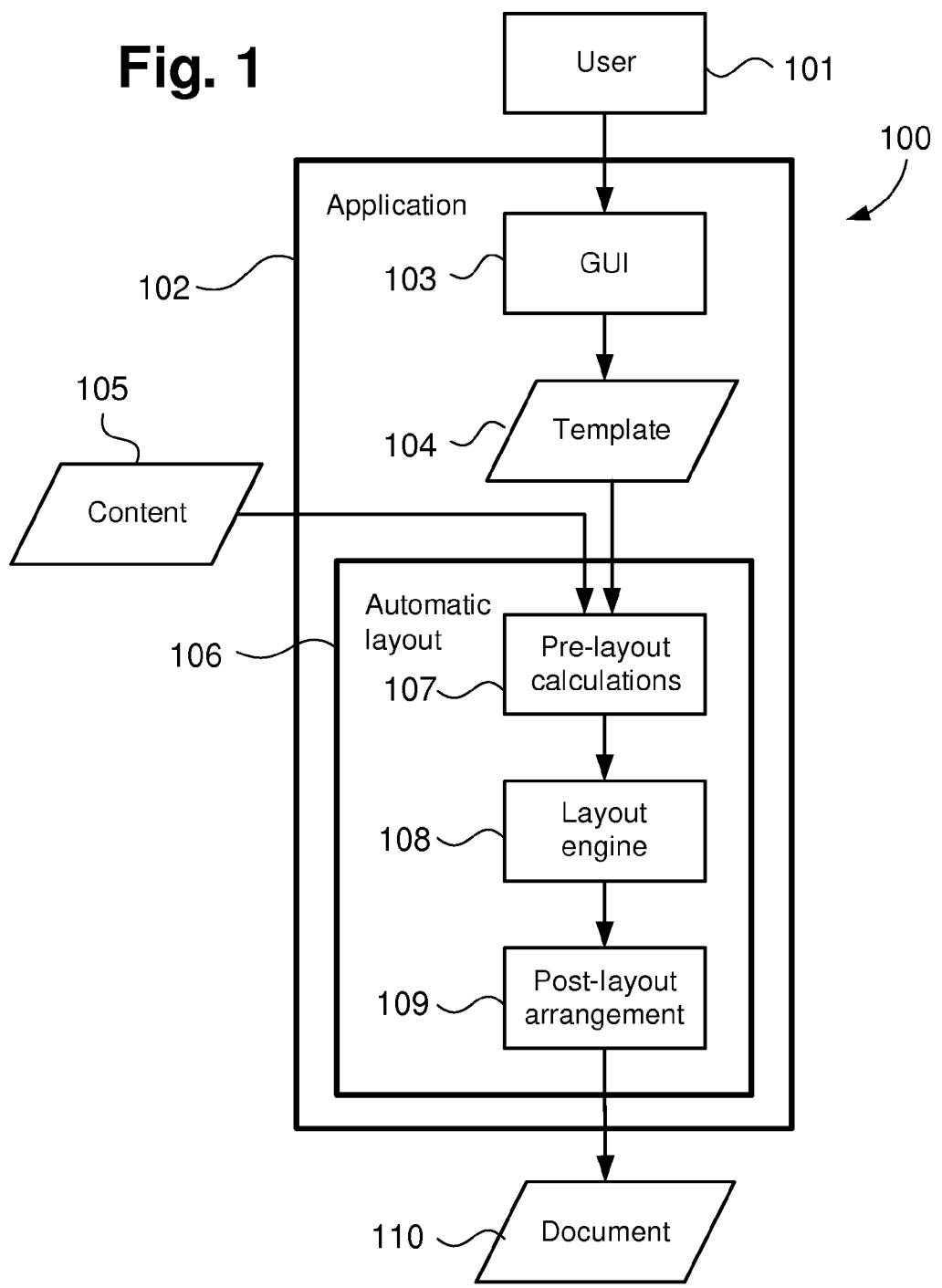
FIG. 1 is a block diagram showing a document generation or authoring system with which embodiments of the invention may be practised.

FIG. 1 illustrates a document system 100 in which a user 101 interacts with computer software application 102, which is preferably implemented as software running on a standard personal computer, through a graphical user interface 103, to create a document template 104. The application 102 combines the document template 104 with content 105 to provide input to an automatic layout process 106. The automatic layout process 106 performs pre-layout calculations 107 to provide input to a layout engine 108. The output of the layout engine 108 is used in a post-layout arrangement stage 109, which produces a final document 110 which may be stored in memory, output for printing, or both. The present disclosure is primarily concerned with the pre-layout calculations 107 and the post-layout arrangement stage 109.

Figure 12:
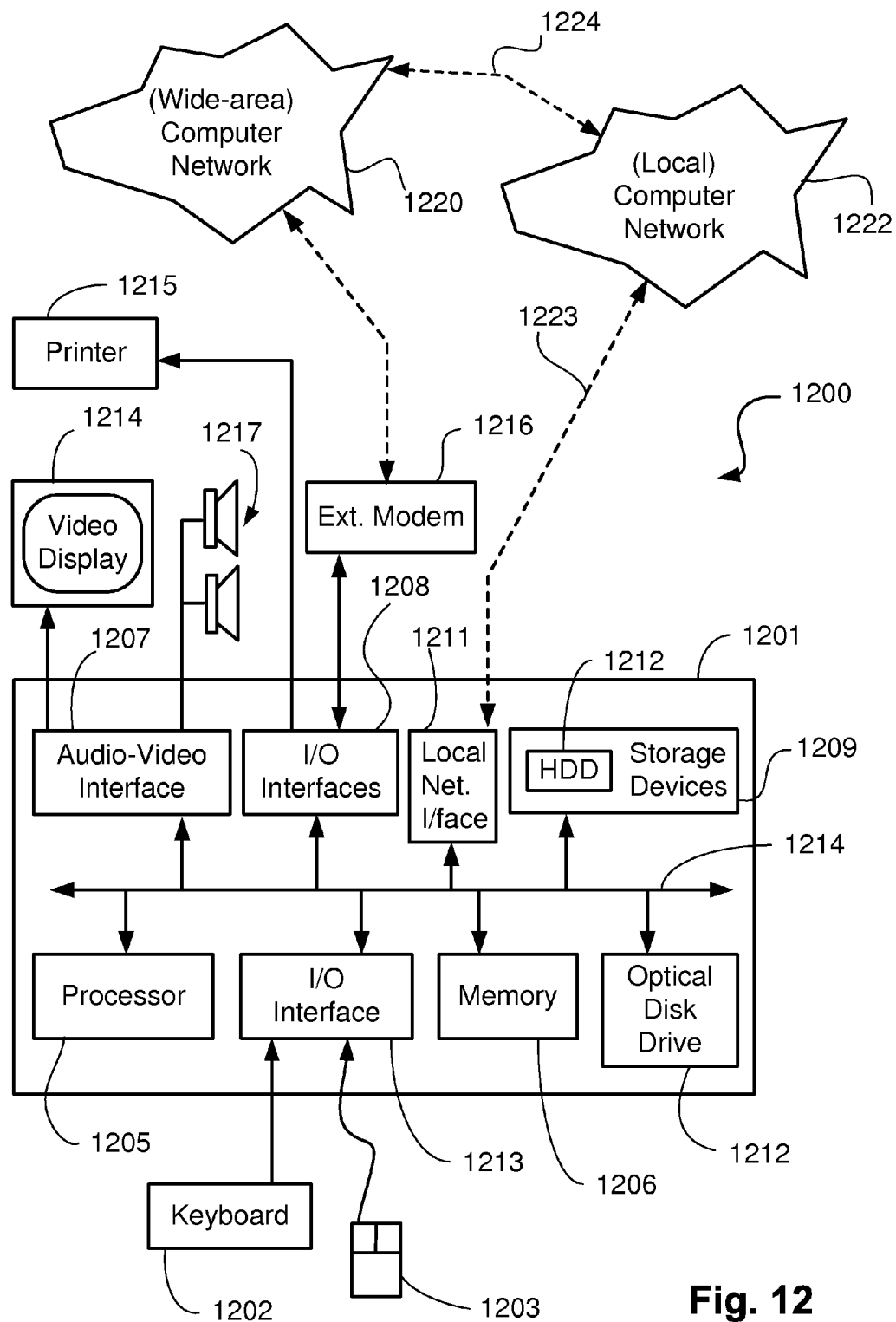
FIG. 12 is a schematic block diagram representation of a computer system upon which the arrangements described may be practised.

An example of the general purpose computer system mentioned above is the computer system 1200, such as that shown in FIG. 12 wherein the processes of FIGS. 1-9 to be described may be implemented as software, such as one or more application programs executable within the computer system 1200. In particular, the steps of method of document generation and laying out objects are effected by instructions in the software that are carried out within the computer system 1200. The instructions may be formed as one or more code modules, each for performing one or more particular tasks. The software may also be divided into two separate parts, in which a first part and the corresponding code modules performs the generation and laying out methods and a second part and the corresponding code modules manage a user interface between the first part and the user. The software may be stored in a computer readable medium, including the storage devices described below, for example. The software is loaded into the computer system 1200 from the computer readable medium, and then executed by the computer system 1200. A computer readable medium having such software or computer program recorded on it is a computer program product. The use of the computer program product in the computer system 1200 preferably effects an advantageous apparatus for generating and laying out documents.

As seen in FIG. 12, the computer system 1200 is formed by a computer module 1201, input devices such as a keyboard 1202 and a mouse pointer device 1203, and output devices including a printer 1215, a display device 1214 and loudspeakers 1217. An external Modulator-Demodulator (Modem) transceiver device 1216 may be used by the computer module 1201 for communicating to and from a communications network 1220 via a connection 1221. The network 1220 may be a wide-area network (WAN), such as the Internet or a private WAN. Where the connection 1221 is a telephone line, the modem 1216 may be a traditional "dial-up" modem. Alternatively, where the connection 1221 is a high capacity (eg: cable) connection, the modem 1216 may be a broadband modem. A wireless modem may also be used for wireless connection to the network 1220.

The computer module 1201 typically includes at least one processor unit 1205, and a memory unit 1206 for example formed from semiconductor random access memory (RAM) and read only memory (ROM). The module 1201 also includes an number of input/output (I/O) interfaces including an audio-video interface 1207 that couples to the video display 1214 and loudspeakers 1217, an I/O interface 1213 for the keyboard 1202 and mouse 1203 and optionally a joystick (not illustrated), and an interface 1208 for the external modem 1216 and printer 1215. In some implementations, the modem 1216 may be incorporated within the computer module 1201, for example within the interface 1208. The computer module 1201 also has a local network interface 1211 which, via a connection 1223, permits coupling of the computer system 1200 to a local computer network 1222, known as a Local Area Network (LAN). As also illustrated, the local network 1222 may also couple to the wide network 1220 via a connection 1224, which would typically include a so-called "firewall" device or similar functionality. The interface 1211 may be formed by an Ethernet™ circuit card, a wireless Bluetooth™ or an IEEE 802.11 wireless arrangement.

The interfaces 1208 and 1213 may afford both serial and parallel connectivity, the former typically being implemented according to the Universal Serial Bus (USB) standards and having corresponding USB connectors (not illustrated). Storage devices 1209 are provided and typically include a hard disk drive (HDD) 1210. Other devices such as a floppy disk drive and a magnetic tape drive (not illustrated) may also be used. An optical disk drive 1212 is typically provided to act as a non-volatile source of data. Portable memory devices, such optical disks (eg: CD-ROM, DVD), USB-RAM, and floppy disks for example may then be used as appropriate sources of data to the system 1200.

The components 1205 to 1213 of the computer module 1201 typically communicate via an interconnected bus 1204 and in a manner which results in a conventional mode of operation of the computer system 1200 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 1210 and read and controlled in execution by the processor 1205. Intermediate storage of such programs and any data fetched from the networks 1220 and 1222 may be accomplished using the semiconductor memory 1206, possibly in concert with the hard disk drive 1210. In some instances, the application programs may be supplied to the user encoded on one or more CD-ROM and read via the corresponding drive 1212, or alternatively may be read by the user from the networks 1220 or 1222. Still further, the software can also be loaded into the computer system 1200 from other computer readable media. Computer readable storage media refers to any storage medium that participates in providing instructions and/or data to the computer system 1200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1201. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1214. Through manipulation of the keyboard 1202 and the mouse 1203, a user of the computer system 1200 and the application may manipulate the interface to provide controlling commands and/or input to the applications associated with the GUI(s).

Figure 2:
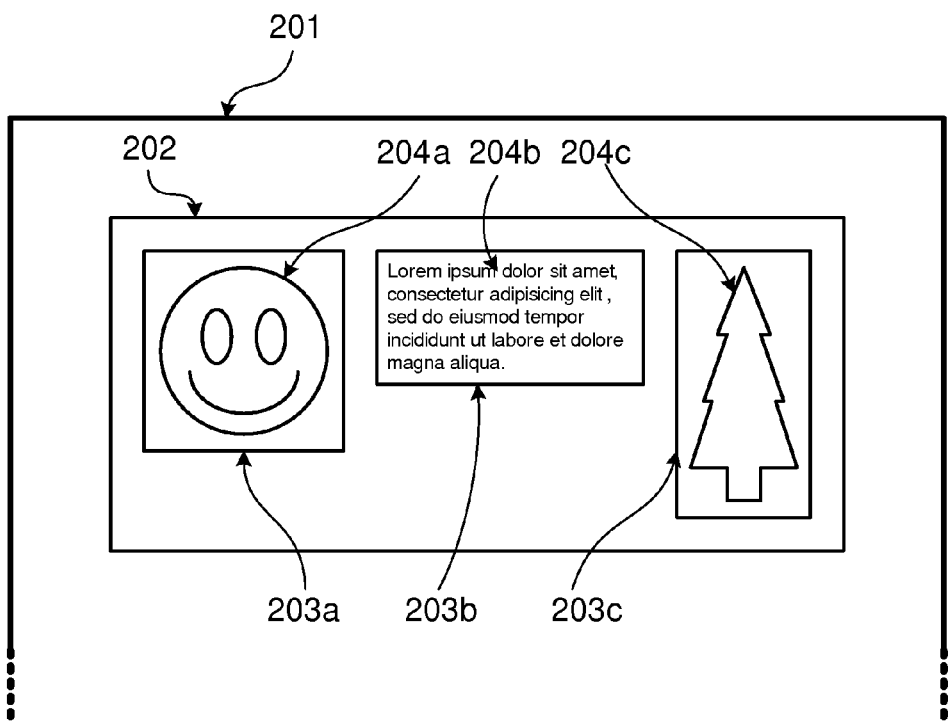
FIG. 2 is an illustration of a document template with content, showing a panel and document elements.

FIG. 2 illustrates an example document as produced by the presently described arrangements, where particular content 204*a*, 204*b* and 204*c* has been chosen to instantiate a document template 201. Each block of content 204*a*, 204*b* and 204*c* is contained within a corresponding document object 203*a*, 203*b* and 203*c*.

Each document object 203 is placed or inserted into the document template within a panel 202. The document template contains one or more panels, and each panel contains a plurality of inserted document objects. For each document object 203, there is a corresponding single panel 202, although a single panel may have multiple document objects 203.

Each panel 202 has a specified size and position on the page. In the preferred implementation, the user gives each panel a direction, such as either horizontal or vertical, which specifies the direction in which document objects 203 are laid out. However, other arrangements such as a grid (where objects 203 are laid out in multiple rows and columns) and overlay (where objects are laid out on top of each other) are possible. In another implementation, the direction for each panel is determined by the writing system corresponding to the locale. For example, a panel might lay out objects horizontally if the system's locale corresponds to a left-to-right or right-to-left writing system; or lay out objects vertically if the system's locale corresponds to a top-to-bottom or bottom-to-top writing system. Preferably, the bounds of the document objects 203 in a panel 202 are kept within the bounds of the panel 202.

Each document object has a shape rule. When used in the application 102, a document object 203 also has associated content. The content may, for example, be an image 204*a* or 204*c*, or a block of text 204*b*.

The shape rule has a preferred size, which specifies the size that automatic layout will attempt to allocate to that document object. This is typically related to the content associated with the object. For example, shape rule may be the dimensions of an image.

The shape rule also defines a way for the object to calculate a new preferred width based upon a given height, or a new preferred height based upon a given width. This allows the object to control how its shape changes if one of its dimensions is constrained to fit a size smaller or larger than its preferred size.

In a preferred implementation, the shape rule uses a "proportionality" measure. The proportionality of a shape rule is a number between 0.0 and 1.0, which specifies the amount by which the object attempts to maintain its aspect ratio. FIGS. 3A-3D illustrate the proportionality of an object 300, shown in FIG. 3A, which has a preferred width of 60 mm and a preferred height of 80 mm. The width of the object 300 may however vary from a minimum of 30 mm to 60 mm (the preferred width) to a maximum of 120 mm.

Figure 3A:
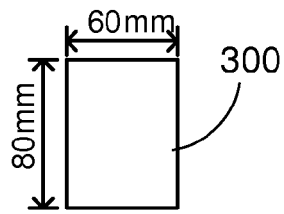
FIGS. 3A-3D illustrate the concept of proportionality.
Figure 3B:
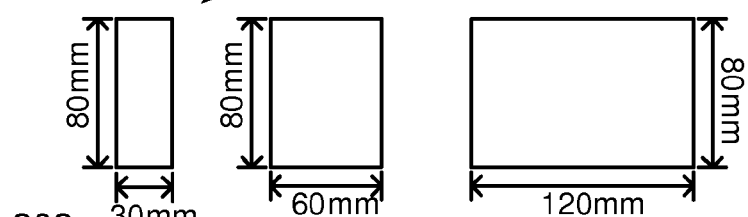

A shape rule with a proportionality of 0.0 is illustrated by the example objects 301 in FIG. 3B. The objects 301 have an independent preferred width and height. That is, for any given width (in the allowable range), the new preferred height as modified according to the shape rule is equal to the preferred height, and for any given height, the new preferred width is equal to the preferred width.

Figure 3C:
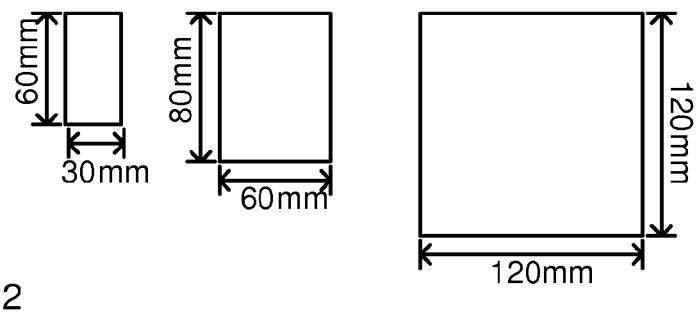
Figure 3D:
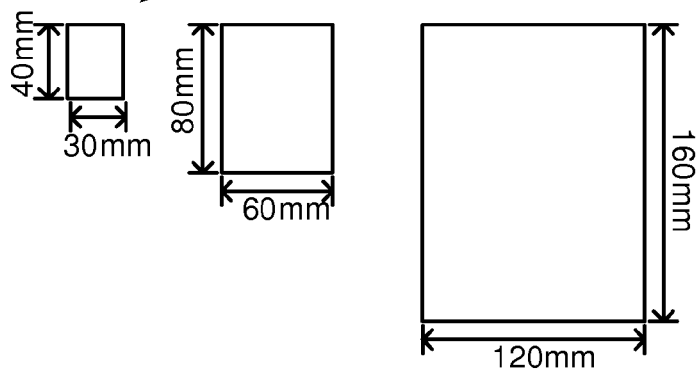

A shape rule with a proportionality of 1.0 is illustrated by the example objects 302 in FIG. 3D. This proportionality maintains the aspect ratio (ratio of width to height or height to width) of the preferred size of the object 300, regardless of the absolute size. For a given width, this shape rule calculates the new preferred height such that it will have the same aspect ratio as the preferred size.

A shape rule with proportionality between 0.0 and 1.0 (i.e. intermediate proportionality), is represented by the example objects 303 in FIG. 3C. This shape rule operates to interpolate linearly between the previous two results (i.e. between proportionality of 0.0 and proportionality of 1.0). For example, a proportionality of 0.5 as illustrated gives a result half way between the result for proportionality 0.0 and the result for proportionality 1.0, as seen for each of the three examples for each proportionality.

Figure 14:
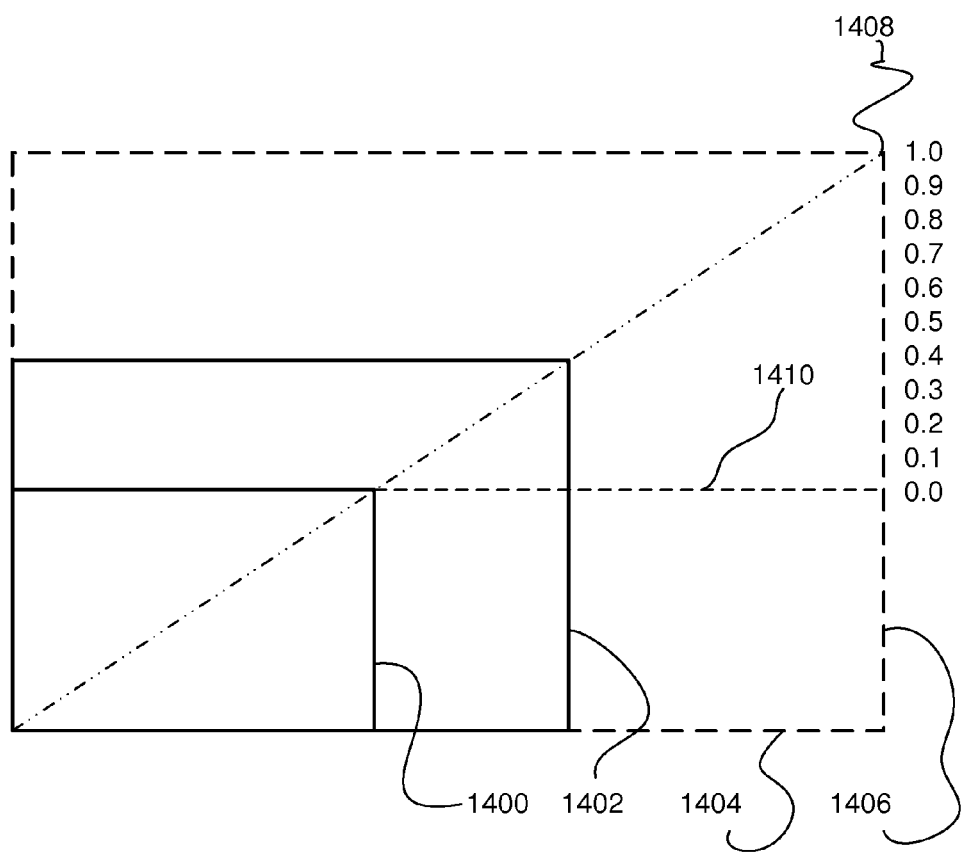
FIG. 14 is a generalised representation of the concept of proportionality as described herein.

A more general representation of the concept of proportionality as used herein is seen in FIG. 14 where an original rectangular object 1400 is provided and which has a maximum specified shape variation represented by an object 1408. The range in height between the two objects 1400 and 1408, being first and second values for size, is graded over a unit interval to define graduations of proportionality between the two extremes. Proportionality is maintained according to the present disclosure where for a proportionality of 1.0, the object is simply scaled equally in each of the horizontal dimension 1404 and the vertical dimension 1406. However, with a proportionality of 0.0, the height of the object remains fixed 1410 at the original size whilst the width may vary between the defined extremes. For an intermediate proportionality value, such as shown at 1402 with proportionality of 0.4, size may be determined by a weighted average of the scaled height and original height, where the proportionality multiplied by the scaled height is added to the remaining proportion multiplied by the original height. For example, when the intermediate value 1402 with proportionality of 0.4 is required, it is calculated by adding 0.4 times the scaled height to 0.6 times the original height. In more general implementations, it is possible to have shape rules that are not a simple calculation from a proportionality value. For example, a shape rule may maintain that an object's preferred size is such that the object always has the same area, given a width. Under these circumstances, the new preferred height would be the area of the preferred size, divided by the given width.

Guides (and Glue)

A document template may also contain a number of guides, each of which has a specific orientation. In a preferred implementation, each guide is either horizontal or vertical. Each guide has a specified position on the page in one dimension—a horizontal guide has a vertical position, and a vertical guide has a horizontal position.

For each edge of a panel, the user may specify that the edge be connected (ie. "glued") to one guide. A panel edge may only be glued to a guide parallel to that edge. In the preferred implementation, the left and right edges of a panel may only be glued to a vertical guide, and the top and bottom edges of a panel may only be glued to a horizontal guide. The edge is constrained to be at the same position as the guide to which it is glued. A guide can have any number of panel edges glued to it.

The user may specify that a guide is "free". If a guide is free, and the guide has at least one panel glued to it on one side, and at least one panel glued to it on the other side, then the guide becomes movable in a direction transverse thereto. With such a configuration, the guide and the glued edges can be automatically moved to a different position during the layout step. If a guide is not free, or if there are no panels glued to it on one or both sides, then the guide will not move automatically.

The automatic layout process 106 may be executed at any time by the application 102, generally in response to a user interaction with the GUI 103. Automatic layout potentially changes the position and size of each layout panel, while attempting to maintain each panel's preferred size. The derivation of a panel's preferred size from that of its objects will be described below. The application 102 or the user can specify constraints within which each panel must be laid out. For example, a panel may have one or more fixed edges, or there may be a fixed offset between the edges of two different panels.

Layout can change the positions of any movable guides—that is, guides that are marked as free and have at least one panel glued to each side—along with all panel edges that are connected to those guides.

Figure 4:
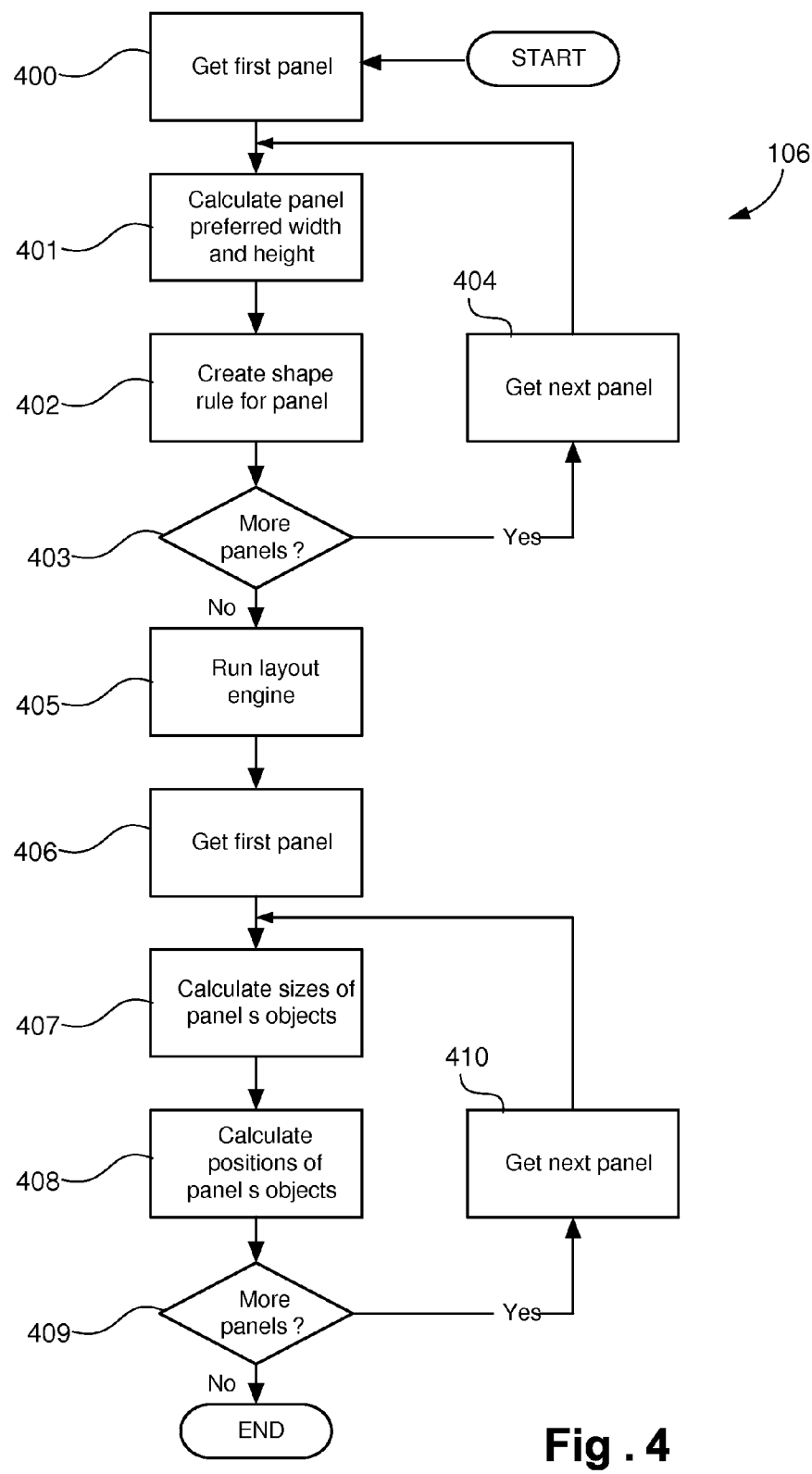
FIG. 4 is a flowchart that shows a process of automatic layout according to the present disclosure.
Figure 5A:
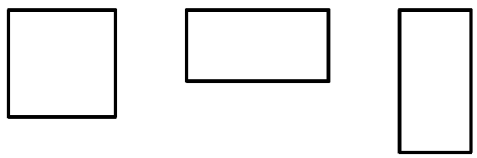
FIGS. 5A-5D illustrate arrangement rules for calculating the preferred size of a panel based on the preferred sizes of its document elements.
Figure 5B:
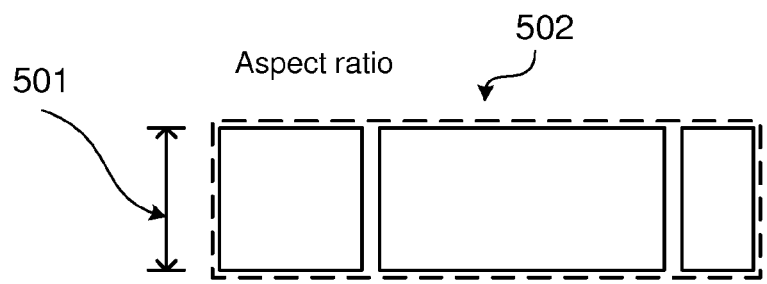
Figure 5C:
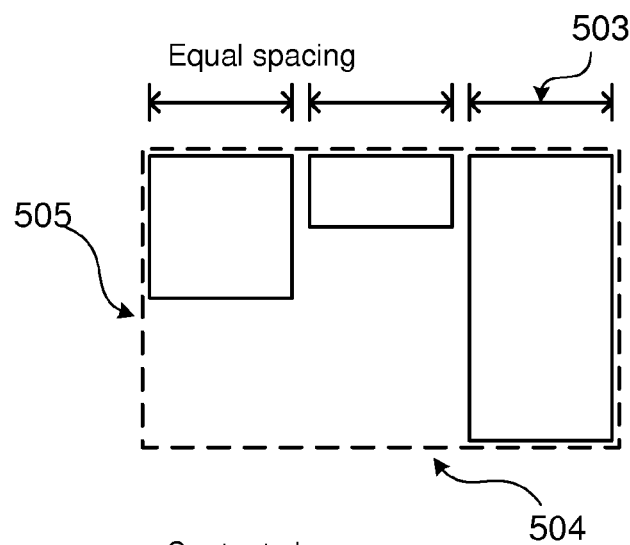
Figure 5D:
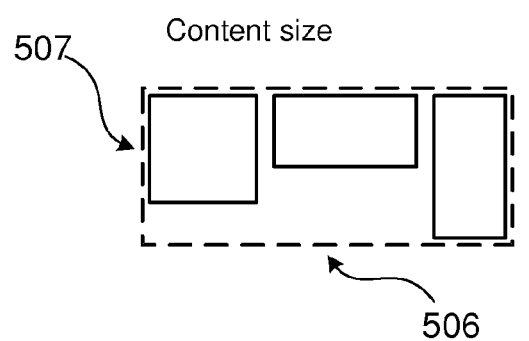

The steps of automatic layout process 106 according to the preferred embodiment of the invention are as follows, as illustrated in the flowchart of FIG. 4. In an initial step 400, the application 102 gets the first panel, this being a precursor to steps 401 to 404 which form a loop implementing the pre-layout calculation stage 107 of the automatic layout process 106.

In step 401, the application 102 determines the preferred size of the current panel. This is done in a way specific to the panel, according to one of several arrangement rules that are available to the user. The arrangement rules for the preferred implementation are described below, and illustrated in FIGS. 5A-5D and FIGS. 9A and 9B. These arrangement rules are described below for a panel in which the objects are arranged horizontally. A complementary description for panels in which the objects are arranged vertically may be derived by transposing width and height. These approaches provided for a setting of the dimensions of the panels in a document and govern how those dimensions are calculated.

a. Aspect ratio: With this arrangement rule, seen in FIG. 5B, a preferred height 501 is chosen or set for the panel. In the preferred implementation, this is the maximum preferred height of the document objects contained by the panel. For each of the objects, a new preferred width is calculated from its shape rule, given the chosen preferred height. The preferred width 502 of the panel is the sum of the new preferred widths of the objects. The effect of the aspect ratio rule is that the preferred width of the panel depends on the preferred height of at least one of the objects, provided that object has non-zero proportionality. The preferred width for example is therefore calculated based upon the preferred height.

b. Equal spacing: With this arrangement rule, seen in FIG. 5C, a preferred width 503 is chosen to apply to all objects in the panel. In the preferred implementation, the preferred width is chosen as the maximum preferred width of the document objects associated with the panel. The preferred width of the panel 504 is the chosen preferred width, multiplied by the number of objects. For each of the objects, a new preferred height is calculated from its shape rule, given the chosen preferred width. The preferred height 505 of the panel is the maximum of the objects' new preferred heights. The effect of the equal spacing rule is that the preferred height of the panel depends on the preferred width of at least one of the objects, provided that object has non-zero proportionality.

c. Content size: With this arrangement rule, seen in FIG. 5D, the preferred width 506 of the panel is the sum of the preferred widths of the corresponding document objects. The preferred height 507 of the panel is the maximum of the preferred heights of the corresponding document objects.

d. Hybrid aspect ratio: With this arrangement rule, seen in FIG. 9A, interim preferred width 901 and preferred height 902 values are calculated as for the equal aspect ratio arrangement rule, and normal preferred width 903 and preferred height 904 are also calculated separately according to the content size rule. The interim width and height values are scaled in the same proportion to reduce the difference between those values and the normal values. One technique for doing this is define the preferred width 905 and preferred height 906 values to be the interim preferred width and preferred height values scaled until the area they define is equal to the area defined by the content size rule. Another technique is to define the preferred width 905 and preferred height 906 values to be the interim preferred width and preferred height values scaled so that the squared difference between the preferred and normal widths plus the squared difference between the preferred and normal heights is minimised. The effect of the hybrid aspect ratio rule is that the preferred height of the panel and the preferred width of the panel each depend on the preferred width of at least one of the objects, provided that object has non-zero proportionality, and the preferred height of at least one of the objects, provided that object has non-zero proportionality.

e. Hybrid equal spacing: In this arrangement rule, seen in FIG. 9B, interim preferred width 907 and preferred height 908 values are calculated as for the equal spacing arrangement rule, and normal preferred width 909 and preferred height 910 are also calculated separately according to the content size rule. The interim preferred width and height values are scaled in the same proportion to reduce the difference between those values and the normal values. One technique for doing this is define the preferred width 911 and preferred height 912 values to be the interim preferred width and preferred height values scaled until the area they define is equal to the area defined by the content size rule. Another technique is to define the preferred width 911 and preferred height 912 values to be the interim preferred width and preferred height values scaled so that the squared difference between the preferred and normal widths plus the squared difference between the preferred and normal heights is minimised. The effect of the hybrid equal spacing rule is that the preferred height of the panel and the preferred width of the panel each depend on the preferred width of at least one of the objects, provided that object has non-zero proportionality, and the preferred height of at least one of the objects, provided that object has non-zero proportionality.

f. A further arrangement rule involves the preferred size of the panel being specified directly by the user.

In one implementation, the user chooses from these arrangement rules for each panel. In another implementation, the arrangement rule is chosen automatically, depending on the contents of the associated document objects. For example, the implementation may choose an "aspect ratio" arrangement rule if the majority of the panel's document objects are images or substantially images, or an "equal spacing" arrangement rule if the majority of the panel's document objects are text or substantially text, or a "content size" rule if the number of image document objects and text document objects are equal or substantially equal.

Returning to FIG. 4, step 402 operates to create a shape rule for the panel. In one implementation, the shape rule comprises a preferred size as calculated in the previous step 401, and a proportionality measure, preferably calculated as the average of the proportionalities of the document objects of the panel. Alternatively, the proportionality may be a different function of the proportionalities of the document objects; or it may be specified by the user.

Additionally, if the panel is known to have either fixed width or fixed height—that is, its opposite edges are not automatically movable, or its minimum and maximum sizes (as defined below) in that dimension are the same—then the preferred size may be adjusted according to the proportionality of the panel, so that its width or height is equal to the fixed width or fixed height. Of course, if the panel has both fixed width and fixed height, then the shape rule can have no effect on the result.

Step 403 then checks if any more panels are included in the template or page layout. If so, control passes to step 404 whereupon the next panel is obtained. Control then returns to step 401 to process the next panel.

Step 405 then runs the layout engine using the panel sizes determined in the previous steps. Step 406 calculates the actual size and position of each panel using the layout engine 108, according to the layout constraints and shape rules applicable to each panel. This may be achieved by moving panel edges that are connected to guides that are movable (marked as free, and have at least one panel glued on each side). The aim is to move movable edges such that the difference between preferred and actual sizes of the panel are minimised. The actual behaviour is defined by the underlying layout engine 108.

The role of a layout engine 108 used for automatic layout 106 is to adjust size and position of containers to best fit a given set of constraints. As such, a layout engine operates as a constraint solver, various types of which are well known in the art. A constraint problem typically involves a set of constraints which must be satisfied exactly, and a second set used to guide the solver to a good solution, without necessarily satisfying all such constraints. The constraints which must be satisfied are referred to as "hard" constraints, and the constraints that may not necessarily be satisfied as "soft" constraints. In the preferred implementation, strength and priority can also be assigned to constraints. Constraints with higher priority can override those with lower priority. For soft constraints with the same priority, those with higher strength have more influence in guiding the solver than those with lower strength.

Figure 10A:
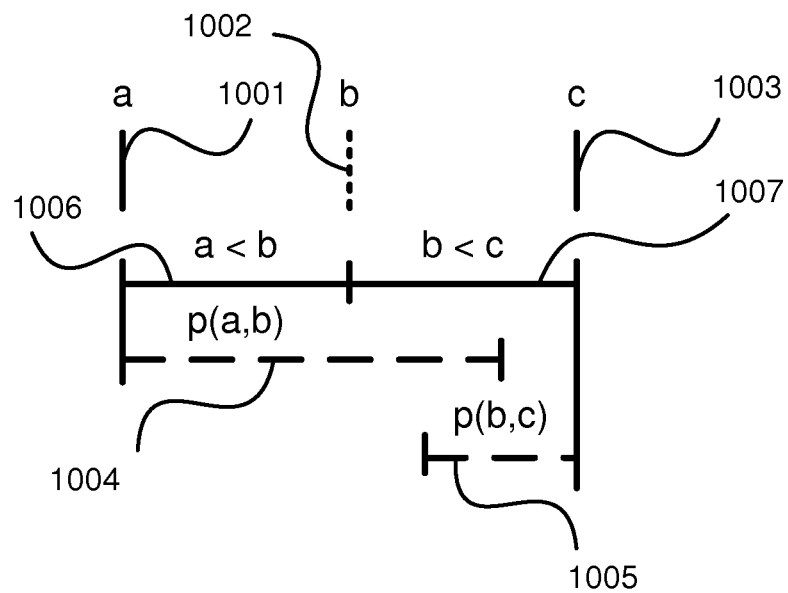
FIGS. 10A and 10B illustrate a layout problem in one dimension and a solution respectively.

FIG. 10A illustrates a constraint problem for automatic layout in one dimension. Items 1001, 1002, and 1003 are called "alignment marks", or just "marks". The marks each represent a position (labelled as a, b, and c respectively) in the layout space along a single axis. Marks 1001 and 1003 are fixed in place such that their position cannot be changed during automatic layout. Mark 1002 is movable, but is forced by hard constraints 1006 and 1007 to remain between marks 1001 and 1003. Soft constraints 1004 and 1005 specify preferred offsets p(a, b) and p(b, c) between marks 1002 and 1001, and marks 1002 and 1003 respectively.

Figure 10B:
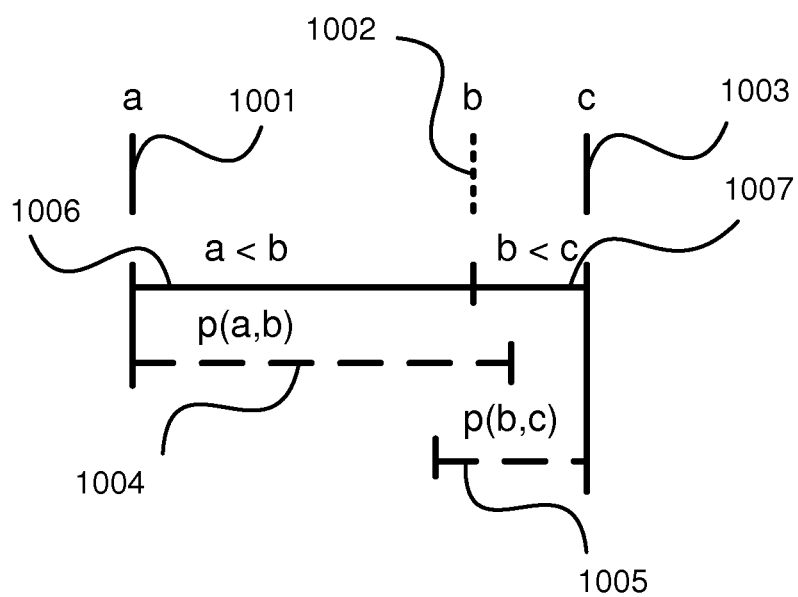

FIG. 10B shows a solution to the constraint problem. Mark 1002 remains between 1001 and 1003, but is now positioned at a compromise between preferred offsets 1004 and 1005. In the preferred implementation, the layout engine 108 models soft constraints 1004 and 1005 as linear springs with respective spring constants equal to the strength value of each constraint, and calculates the final position of 1002 at their equilibrium point using static mechanics principles.

In more than one dimension, containers can be defined by representing each of their edges as a mark along some axis. Typically, two perpendicular axes are used, allowing the definition of rectangular containers. Two marks along one axis are used to represent a container's top and bottom edges, and two marks along the perpendicular axis represent its left and right edges.

Additional soft constraints can be associated with a container, to specify its preferred size and shape. For example, a preferred size constraint can specify a preferred offset between a container's marks along the same axis. A preferred shape constraint can specify a relationship between marks along different axes. For example, a shape constraint may indicate that a container tries to maintain its aspect ratio, by specifying that the preferred distance between two marks on one axis is proportional to the actual distance between two marks on the other axis, and vice versa. As another example, a shape constraint may indicate that a container tries to maintain a constant area. It is often useful to specify both a preferred size and shape for each container, with different strengths to vary the degree of influence from each constraint. In the preferred implementation, shape constraints are solved for each axis by using a partial solution from other axes, iterating across all axes until equilibrium is reached.

One outcome of using a constraint solving approach to layout a document is that functional relationships are established between the laid out sizes of containers. In the constraint problem shown in FIG. 10A, for example, the total distance from mark 1001 to mark 1003, and therefore the sum of the distances from mark 1001 to mark 1002 and from mark 1002 to mark 1003, is a constant. This corresponds to a functional relationship between the widths of the two corresponding containers. Additionally, there is a functional relationship between the preferred sizes of each of the containers and the laid out sizes of those containers, as defined by the soft constraints. One implementation might arrive at a layout by distributing the difference between the actual and preferred sizes of each of the offsets equally. Accordingly, the example in FIG. 10B, it would be the case that:

$$abs((b-a)-p(a, b))=abs((c-b)-p(b, c)).$$

Another implementation might arrive at a different layout, where the ratio between the offsets is the same as the ratio between the corresponding preferred offsets, so that, again in FIG. 10B:

$$(b-a)/p(a, b)=(c-b)/p(c, b).$$

Figure 11A:
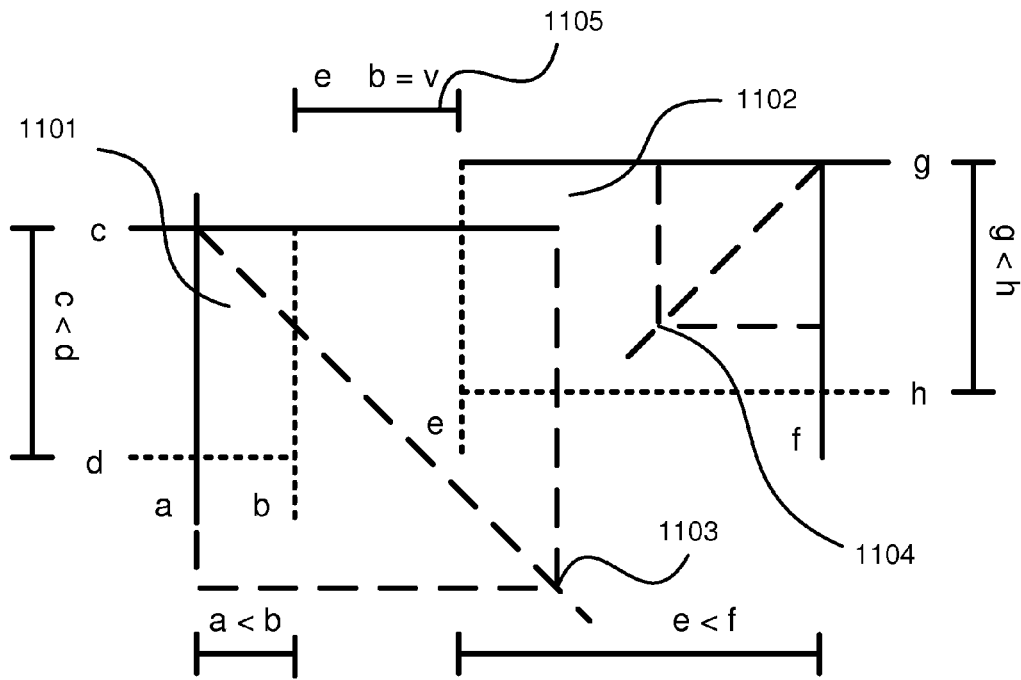
FIGS. 11A and 11B illustrate a layout problem and solution respectively for the layout engine of FIG. 1.

FIG. 11A shows an automatic layout problem in two dimensions. Rectangular content containers 1101 and 1102 are each defined by four marks across two axes, each labelled by a lower case letter indicating its position along the corresponding axis. The left and top edges of container 1101 (marks a and c), and the right and top edges of container 1102 (marks f and g), are fixed in place, and therefore drawn as solid lines, with their other edges (marks d, b, h, and e) moveable and therefore drawn as dashed lines. Both containers 1101 and 1102 are constrained to have a positive size in each dimension. The hard constraint 1105 forces the right edge of container 1101 (mark b) and the left edge of container 1102 (mark e) to remain a fixed distance apart. Soft constraints 1103 and 1104 represent combined size and shape rules, each specifying a preferred size and aspect ratio, and are associated with containers 1101 and 1102 respectively.

Figure 11B:
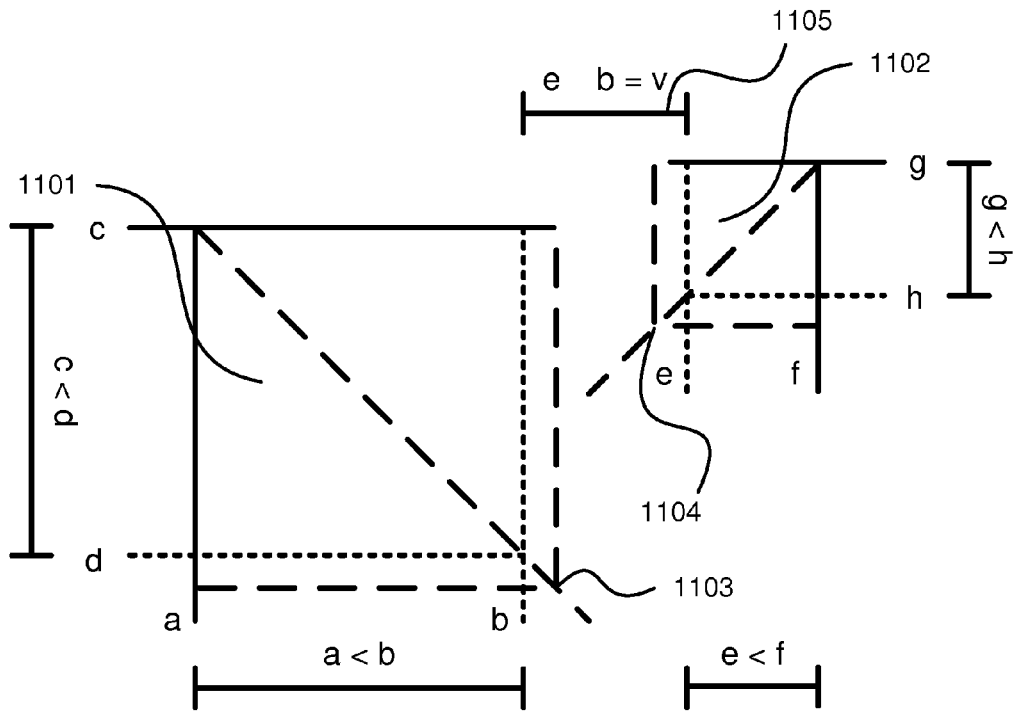

A solution to this layout is shown in FIG. 11B. The final bounds for containers 1101 and 1102 (with edges corresponding to marks d, b, h, and e drawn as dotted) are as close as possible to their preferred sizes, whilst maintaining all hard constraints, and staying close to their preferred aspect ratio. If the shape component was removed from constraints 1103 and 1104, allowing marks d and h to move independently of marks b and e respectively, both containers would reach their preferred height in this example.

The operation of the layout engine 108 is such that the dimensions of the panel are interdependent, so that the actual width of the panel is dependent on the preferred height of the panel and the actual height of the panel is dependent on the preferred width of the panel, provided the panel has non-zero proportionality. Steps 406 to 410 form a loop that implements a post-layout arrangement phase 109 of the automatic layout process 106.

Step 407 operates to calculate the actual size of each document object. This is done in a way specific to each panel, according to one of several further arrangement rules which are available to the user. The arrangement rules may be automatically chosen to correspond to the arrangement rules selected in step 401 to determine the preferred size of the panel in question.

Examples of further arrangement rules according to the preferred implementation and useful in the post-layout arrangement 109 are described below. Again, it is assumed that the document objects are arranged horizontally within the panel; the description for panels in which the objects are arranged vertically is derived by transposing width and height.

a. Aspect ratio: With this arrangement rule, an unscaled size is calculated to enclose the objects of a panel, with width equal to the sum of the preferred widths of the objects, and height equal to the maximum of the preferred heights of the objects. This unscaled size is uniformly scaled such that both width and height fit within the actual dimensions of the panel, with at least one of the scaled width and height being equal to the actual width or height of the panel. This scaled height is used for the actual height of each object. The width of each object is calculated from the scaled height according to the shape rule of the object. The effect of the aspect ratio rule is that the actual width of at least one object depends on the actual height of the panel, provided that object has nonzero proportionality.

b. Equal spacing: According to this arrangement rule the actual width of a panel is divided equally between the objects associated with the panel, so that each object has the same actual width. The actual height of each object is calculated from its shape rule, to a maximum of the actual height of the panel. The effect of the equal spacing rule is that the actual height of at least one object depends on the actual width of the panel, provided that object has non-zero proportionality.

c. Content size: According to this arrangement rule, the initial width of each object is the preferred width of the object. If the sum of the widths of the objects is greater than the actual width of the panel, then the size of each object is scaled down by a common ratio so that the sum of the widths of the objects is equal to the actual width of the panel. Further the actual height of each object is set or calculated initially as the preferred height of the objects. The actual height is then adjusted according to the shape rule of the objects, given the scaled width of the object, to a maximum height of the actual height of the panel.

Returning again to FIG. 4, step 408 then operates to calculate the new position of each document object, as illustrated in FIG. 6. This is done according to alignment options specified by the user, without changing the size calculated in the previous step. Generally this will position document objects so that the objects do not overlap, there is a space of at least a user-specified inter-object spacing distance 601 between each object, there is a space of at least a user-specified internal margin 602 between the boundary of all the objects and the panel bounds, and the objects are arranged in either a horizontal row or a vertical column as specified by the user.

Minimum and Maximum Sizes and Consistency

The user may specify a minimum and maximum width and height for each panel. The layout engine 108 ensures that neither the user nor the automatic layout process 106 may change the panel to a size that is smaller than its minimum size in either dimension, or larger than its maximum size in either dimension.

Also, the user may specify a minimum width and height for each document object. The post-layout arrangement stage 109 will not make the object smaller than this size in either dimension.

If at any time the minimum sizes of document objects in a panel exceed the minimum size of the panel, then all calculations will use the larger minimum size calculated for the panel from the objects' minimum sizes. This ensures that a panel will never be too small to satisfy the minimum sizes of its objects. The exceeding of the size may occur where, for example, if the total minimum width of the object exceeds the minimum width of the panel, or where the largest minimum height of the object exceeds the minimum height of the panel, in a horizontally arranged pane.

The application 102 preferably prevents the user from performing an action which will make the laid-out document inconsistent with the minimum and maximum sizes of its panels and document objects. In particular:

The user may not change the bounds of a panel so that it is smaller than its minimum size or larger than its maximum size in either dimension.

The user may not change the maximum size of a panel to be smaller than the smallest size the panel could reach by moving its movable edges such that it does not violate the minimum or maximum sizes of any adjacent panels; or change the minimum size of the panel to be larger than the largest size that the panel could similarly reach.

The user may not change the maximum size of a panel to be smaller than the smallest size that would fit the panel's document objects, taking into account the objects' minimum sizes, the inter-object spacing, and the panel's internal margins.

The user may not change the orientation of a panel such that the panel's document objects are no longer able to fit within the panel's maximum size.

Alternatively, instead of preventing the user from performing these actions, the system may change the document template 104 such that the user's action does not cause an inconsistency. For example, if the user attempts to change the bounds of a panel so that it is larger than the panel's maximum size, the system may increase the panel's maximum size and then perform the action.

The underlying layout engine 108 maintains consistency between the minimum and maximum sizes of panels.

In the preferred implementation, in order to maintain minimum object sizes after the automatic layout process, an additional step 407a is added to automatic layout process 106 to correct any violations of object minimum sizes by modifying object sizes. This additional step 407a occurs between steps 407 and 408 of the automatic layout process 106 described above. Step 407a increases the size of each document object that is below its minimum size so that it is at least its minimum size, and distributes the corresponding loss of space between the remaining document objects by decreasing or reducing their respective heights. Step 407a is described below, with reference to the flowchart in FIG. 7, and illustrated in FIGS. 8A-8E. This description of step 407a applies to a panel in which the objects are arranged horizontally. A corresponding description for panels in which the objects are arranged vertically is derived by using object heights instead of widths.

Figure 7:
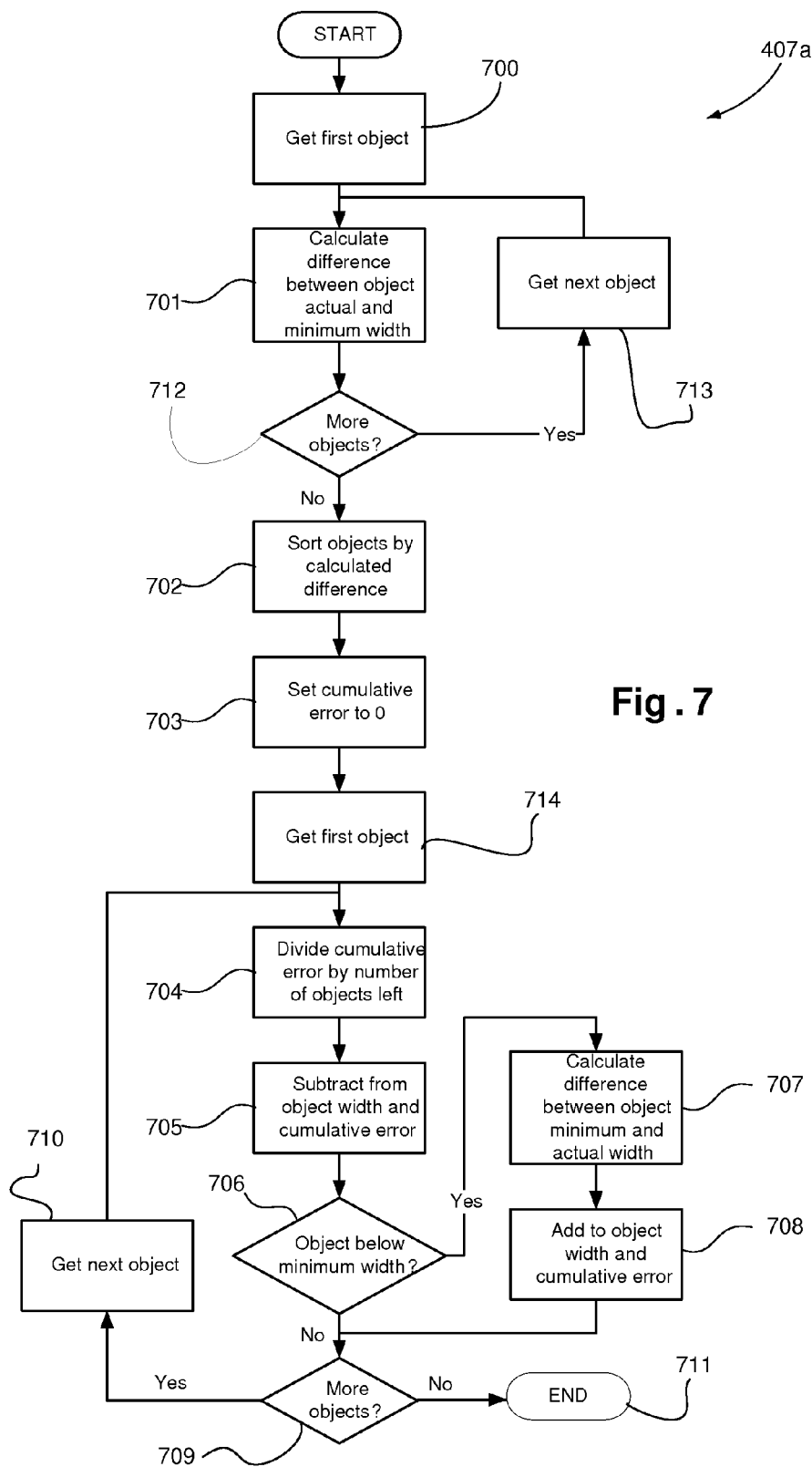
FIG. 7 is a flowchart showing the process of adjusting document elements after arrangement to preserve their minimum size.
Figure 8A:
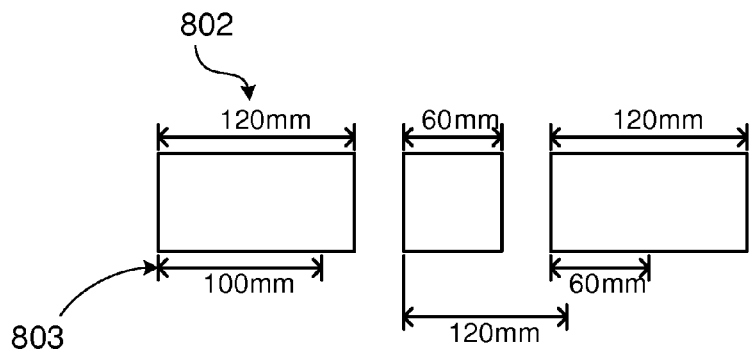
FIGS. 8A-8E illustrate the process of adjusting document elements after arrangement to preserve their minimum size.
Figure 8B:
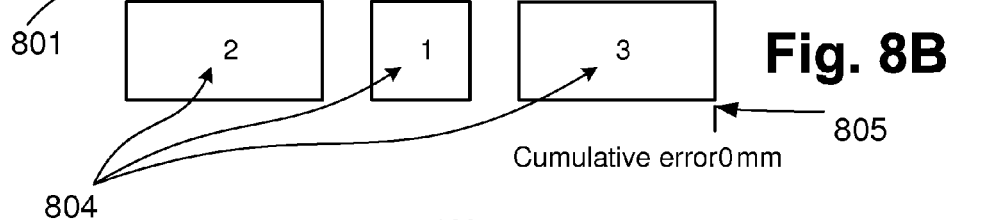
Figure 8C:
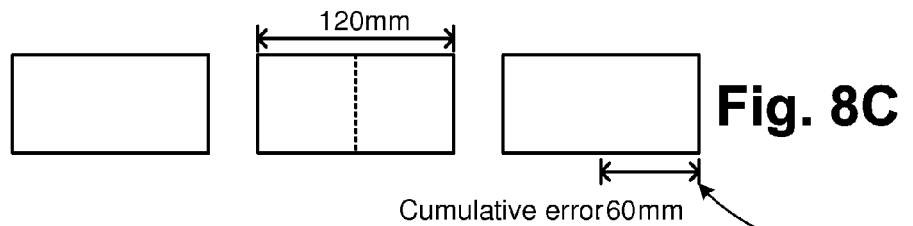
Figure 8D:
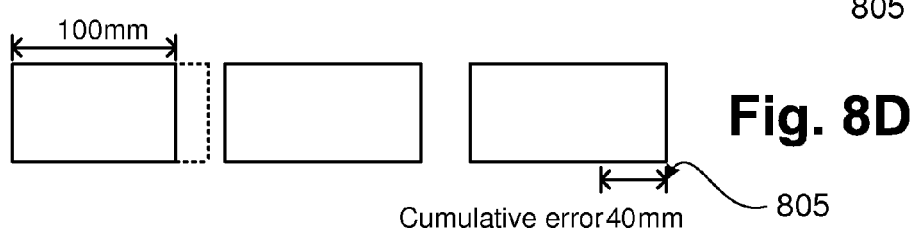
Figure 8E:
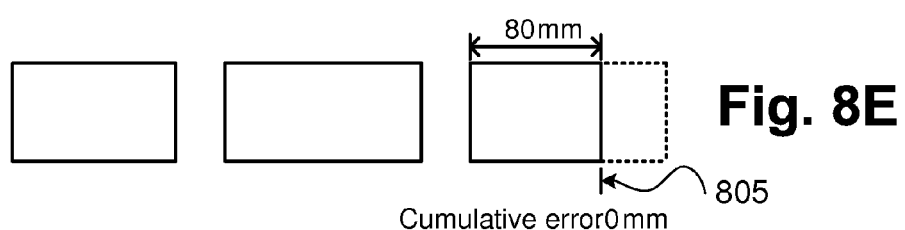
Figure 9A:
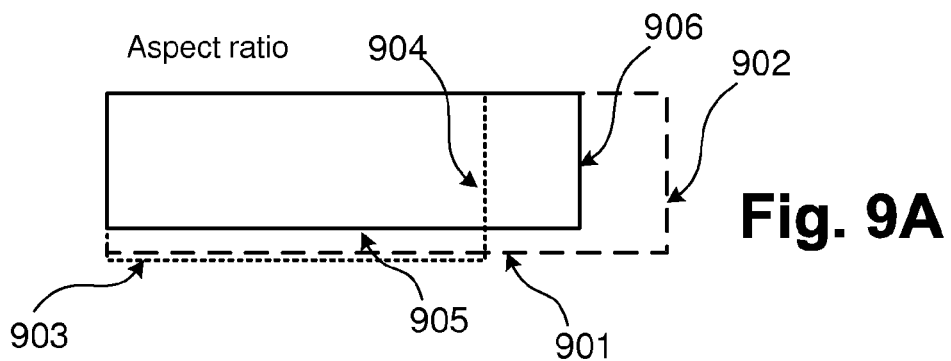
FIGS. 9A and 9B illustrate the hybrid arrangement rules for calculating the preferred size of a panel based on the preferred sizes of its document elements.
Figure 9B:
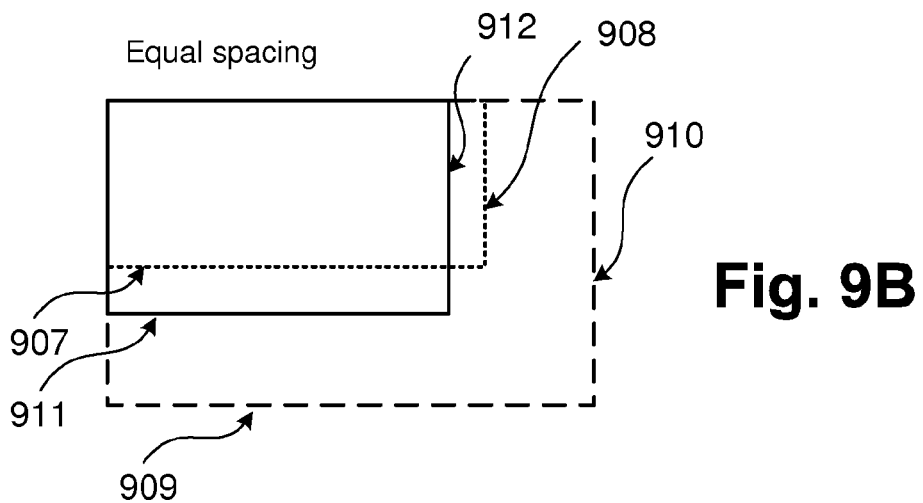

With reference to FIG. 7, step 700 gets the first object in a panel and step 701 then calculates the difference 801 between the actual width 802 of the object, and the minimum width 803 of the object. This value will be negative if the object is smaller than its minimum width, or positive if the object is larger than its minimum width. Step 712 tests for more objects and if so, step 713 gets the next object and returns to step 701, thus implementing a loop for each document object in the panel.

In step 702, the list of the document objects in the panel is sorted according to the value calculated in step 701, in ascending order 804.

Step 703 then operates to set an initial cumulative error value at zero. This value corresponds to the amount by which the current total width of an object exceeds the total width of the object before the adjustment process began, as seen at 805 in FIG. 8D.

Step 714 then gets the first object in the panel and, together with steps 709 and 710 implements the remainder of step 407a for each document object in the sorted list. The process in step 704 then divides the cumulative error by the number of remaining objects including this one, and in step 705 subtracts that value from both the width of the document object and the cumulative error. Step 706 then checks whether the object is below its minimum width. If it is, step 707 is implemented to increase the width of the object by an amount that makes the object equal to its minimum width. Step 708 then adds that amount to the cumulative error.

In the preferred implementation, in which document objects are arranged either horizontally or vertically in a panel, step 407a is only executed in the corresponding dimension. In the other dimension, it is sufficient to check whether each object is below its minimum size, and if so, enlarge it to its minimum size. In a more general implementation, the above process may be executed in both dimensions.

Figure 13:
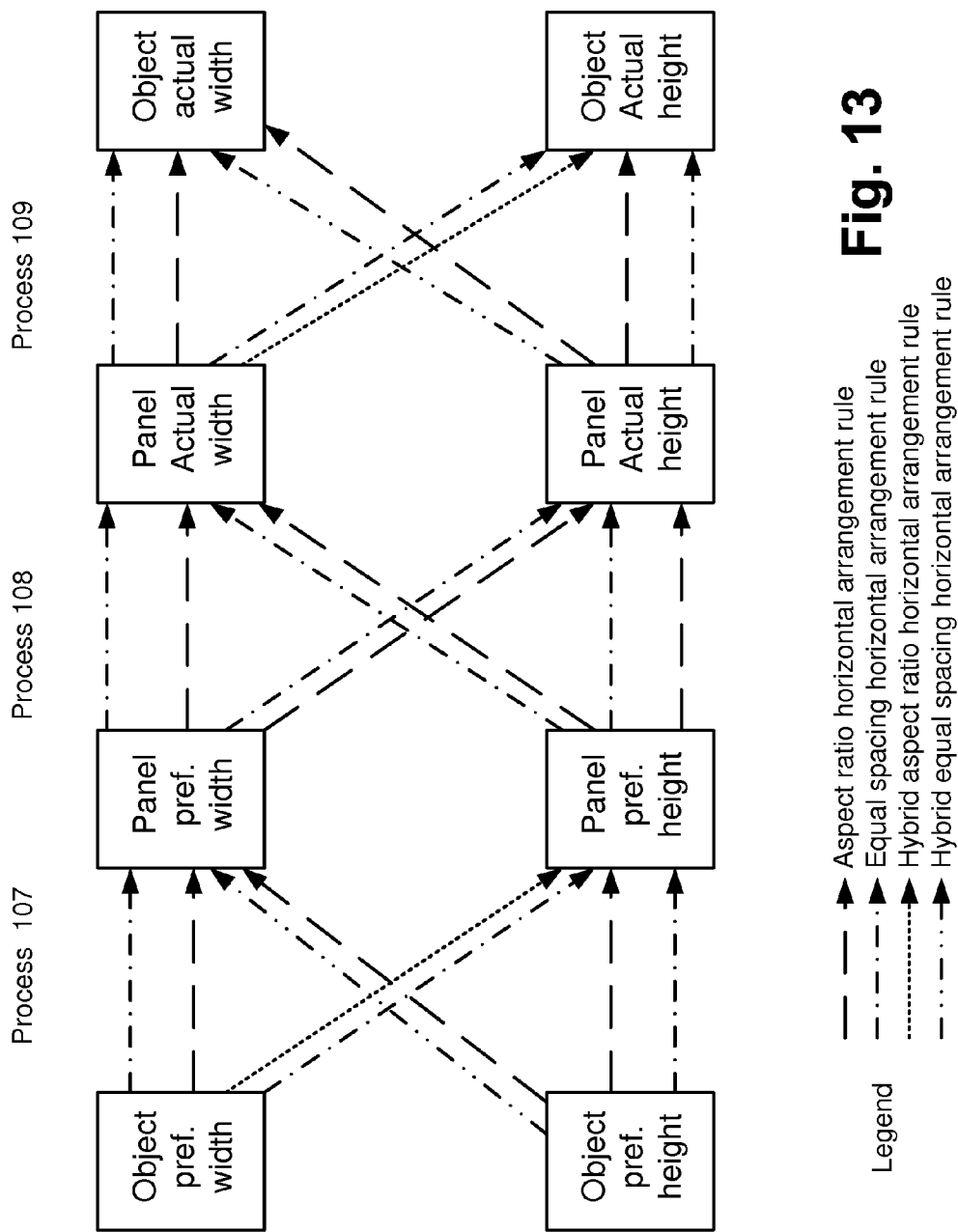
FIG. 13 schematically illustrates the variety of combinations of arrangement rules that may be applied according to the present disclosure.

FIG. 13 provides an illustrative summary of the various processing paths that may be used according to the present disclosure. The processing described operates on objects and panels each of which having a preferred width and height, and an actual width and height. The processes themselves are those performed by the automatic layout process 106 including the pre-layout calculations process 107, the layout engine process 108 and the post-layout arrangement process 109. Using one of the various arrangement rules identified in the legend of FIG. 13, process 107 may commence with either an object preferred width or an object preferred height. Process 107 then specifies the panel preferred width or the panel preferred height according to the arrangement rule used. The layout engine process 108 then uses the appropriate arrangement rule to determine the panel actual width or the panel actual height. With one of these values, the process 109 then determines according to the arrangement rules the object actual width or object actual height thereby laying out the objects within the panel upon the page. This approach contrasts prior art arrangements where width is dealt with first in its entirety and the height is dealt with in its entirety. For the hybrid arrangement rules the arrows represented are intended to be in addition to those for the equivalent non-hybrid rule. Further, for the hybrid rules, both panel preferred width and height depend on object preferred width and height.

Industrial Applicability

It will be apparent from the above that the arrangements described are applicable to the computer and data processing industries and particularly where automated document layout is desired, often using variable data.

The foregoing describes only some embodiments of the present invention, and modifications and/or changes can be made thereto without departing from the scope and spirit of the invention, the embodiments being illustrative and not restrictive. For example, whilst FIGS. 10 and 11 show one example of the layout engine 108 other types of layout engine may be used. Further, as will be apparent from the forgoing, many of the implementations described operate sequentially on width then height, or vice versa. As such, the each of the various methods described for layout out objects on a page has a dimensional complement which implements an equivalent method within the scope of the present disclosure.

We claim:

1. A method of laying out objects on a page, each said object having a preferred height and a preferred width, said method comprising:
   (a) arranging a first plurality of said objects within a first panel according to a first arrangement rule;
   (b) calculating a preferred width and height of the first panel, based on the preferred width of at least one of the first plurality of said objects;
   (c) arranging a second plurality of said objects within a second panel according to a second arrangement rule;
   (d) calculating a preferred width and height of the second panel, based on the preferred height of at least one of the second plurality of said objects;
   (e) laying out the first and second panels within the page, thereby determining an actual width and height of each of the first and second panels based on the preferred heights and widths of both the first and second panels; and
   (f) laying out (i) the first plurality of said objects within the first panel thereby determining an actual width and height of each of the first plurality of said objects based on the determined actual width and height of the first panel and the arrangement rule within the first panel and (ii) the second plurality of said objects within the second panel thereby determining an actual width and height of each of the second plurality of said objects based on the determined actual width and height of the second panel and the arrangement rule within the second panel.

2. A method according to claim 1, wherein said first arrangement rule comprises one of an equal spacing horizontal rule and an aspect ratio vertical rule.

3. A method according to claim 1, wherein said second arrangement rule comprises one of an aspect ratio horizontal rule and an equal spacing vertical rule.

4. A method according to claim 1, wherein a functional relationship is defined between the actual widths and actual heights of the first and second panels, and wherein step (e) further comprises satisfying the functional relationship.

5. A method according to claim 1, further comprising the step of choosing one of the arrangement rules, wherein the choosing comprises at least one of: (i) choosing an aspect ratio rule if the objects substantially comprise images; (ii) choosing an equal spacing rule if the objects substantially comprise text objects; and (iii) choosing a content size rule if the number of image objects and the number of text objects are substantially equal.

6. A method according to claim 1, further comprising the step of choosing a direction for the arrangement rule, by: (i) providing a locale for use in laying out objects on a page; (ii) selecting a horizontal direction if the locale corresponds to a left-to-right or right-to-left writing system; (iii) selecting a vertical direction if the locale corresponds to a top-to-bottom or bottom-to-top writing system.

7. A method according to claim 1, wherein one said arrangement rule comprises an aspect ratio rule, said method comprising: (i) scaling the preferred sizes of the objects to an equal height; (ii) calculating a size to enclose the objects of the panel and having a width being a sum of said scaled widths of the objects and height being the equal height of the objects; (iii) scaling the size such that the width and height thereof fit within the panel and one of the height and width is equal to the height and width respectively of the panel; (iv) using at least the scaled height to determine the width of each said object; and (v) placing each object into the panel according to the scaled height and the corresponding determined width.

8. A method according to claim 1, wherein one said arrangement rule comprises an equal spacing rule and said method comprises: (i) dividing an actual width of the panel between the objects such that each object has the same actual width; (ii) calculating an actual height of each of each said object according to a shape rule of the object, to a maximum height of the panel; and (iii) placing each object into the panel according to the scaled height and the corresponding determined width.

9. A method of laying out objects on a page, said method comprising:
   (a) arranging a first plurality of objects within a first panel according to a first arrangement rule;
   (b) arranging a second plurality of objects within a second panel according to a second arrangement rule;
   (c) laying out the first and second panels within the page based on preferred heights and widths of both of the first and second panels, thereby determining an actual width and height of each of the first and second panels;
   (d) calculating an actual height of at least one object within the first panel according to the first arrangement rule, based on the actual width of the first panel; and
   (e) calculating an actual width of at least one object within the second panel according to the second arrangement rule, based on the actual height of the second panel.

10. A method according to claim 9, further comprising the step of choosing one of the arrangement rules, wherein the choosing comprises at least one of: (i) choosing an aspect ratio rule if the objects substantially comprise images; (ii) choosing an equal spacing rule if the objects substantially comprise text objects; and (iii) choosing a content size rule if the number of image objects and the number of text objects are substantially equal.

11. A method according to claim 9, further comprising the step of choosing a direction for the arrangement rule, by: (i) providing a locale for use in laying out objects on a page; (ii) selecting a horizontal direction if the locale corresponds to a left-to-right or right-to-left writing system; (iii) selecting a vertical direction if the locale corresponds to a top-to-bottom or bottom-to-top writing system.

12. A method of setting preferred dimensions for at least two panels of a plurality of panels, said at least two panels each containing a plurality of objects, each object having preferred dimensions including a preferred height and a preferred width, said panels being adapted to be laid out on a page, said method comprising the steps of:
   (a) inserting a plurality of said objects horizontally within a first one of said at least two panels;
   (b) inserting a plurality of said objects horizontally within at least a second one of said at least two panels;
   (c) selecting an arrangement rule for each panel of said at least two panels, said arrangement rule governing how preferred dimensions of the corresponding panel are calculated from the preferred dimensions of the objects inserted into that panel, wherein the at least two of said plurality of panels have a different arrangement rules, said arrangement rule being one of:
      (i) a preferred width of said panel depends on the preferred height of the objects inserted into that panel, and
      (ii) a preferred height of said panel depends on the preferred width of the objects inserted into that panel;

(d) calculating the preferred width and height of (i) said first panel from the preferred widths and heights of the objects inserted into said first panel according to the selected arrangement rule for said first panel and (ii) said second panel from the preferred widths and heights of the objects inserted into said second panel according to the selected arrangement rule for said second panel; and (e) determining an actual width and height of (i) said first panel based on the preferred height and width of said first panel and (ii) said second panel based on the preferred width and height of said second panel.

13. A method according to claim 12, further comprising the step of choosing one of the arrangement rules, wherein the choosing comprises at least one of: (i) choosing an aspect ratio rule if the objects substantially comprise images; (ii) choosing an equal spacing rule if the objects substantially comprise text objects; and (iii) choosing a content size rule if the number of image objects and the number of text objects are substantially equal.

14. A method according to claim 12, further comprising the step of choosing a direction for the arrangement rule, by: (i) providing a locale for use in laying out objects on a page; (ii) selecting a horizontal direction if the locale corresponds to a left-to-right or right-to-left writing system; (iii) selecting a vertical direction if the locale corresponds to a top-to-bottom or bottom-to-top writing system.

15. A method according to claim 1 further comprising:
determining actual dimensions of a plurality of objects to be arranged within a plurality of panels that have been laid out on a page, each said panel having an actual width and height and containing a plurality of objects arranged one of horizontally and vertically therein, said determining comprising:
(a) selecting an arrangement rule for each said panel, said arrangement rule governing how the actual dimensions of the objects to be arranged in said panel are calculated from the actual dimensions of said panel, wherein at least two of said plurality of panels have a different arrangement rule, said arrangement rule being one of:
(i) the actual width of an object depends on the actual height of the panel, and
(ii) the actual height of an object depends on the actual width of the panel;
(b) calculating the actual width and height of each said object from the actual widths and heights of said panel to which the object belongs, according to the selected arrangement rule for said panel.

16. A method according to claim 15, wherein said determining further comprises choosing one of the arrangement rules, wherein the choosing comprises at least one of: (i) choosing an aspect ratio rule if the objects substantially comprise images; (ii) choosing an equal spacing rule if the objects substantially comprise text objects; and (iii) choosing a content size rule if the number of image objects and the number of text objects are substantially equal.

17. A method according to claim 15, wherein the determining further comprises choosing a direction for the arrangement rule, by: (i) providing a locale for use in laying out objects on a page; (ii) selecting a horizontal direction if the locale corresponds to a left-to-right or right-to-left writing system; (iii) selecting a vertical direction if the locale corresponds to a top-to-bottom or bottom-to-top writing system.

18. A method according to claim 1, wherein each said panel has an actual width and height and contains a plurality of the objects, each said object having a preferred size including a preferred width and preferred height, the objects being arranged horizontally therein, said method further comprising the steps of:
(i) scaling the preferred sizes of the objects to an equal height;
(ii) calculating a size to enclose the objects of the panel and having a width being a sum of preferred widths of the objects and height being the equal height of the objects;
(iii) scaling the size such that the width and height thereof fit within the panel and one of the height and width is equal to the height and width respectively of the panel;
(iv) using at least the scaled height to determine the width of each said object; and
(v) placing each object into the panel according to the scaled height and the corresponding determined width.

19. A method according to claim 18, wherein step (iii) comprises using the scaled height and a shape rule for the corresponding object to determine the corresponding width.

20. A method according to claim 1, wherein each said panel has an actual width and height and contains a plurality of the objects arranged vertically therein, said method further comprising the steps of:
(i) scaling the preferred sizes of the objects to an equal width;
(ii) calculating a size to enclose the objects of the panel and having a height being a sum of preferred heights of the objects and width being the equal width of the objects;
(iii) scaling the size such that the width and height thereof fit within the panel and one of the height and width is equal to the height and width respectively of the panel;
(iv) using at least the scaled width to determine the height of each said object; and
(v) placing each object into the panel according to the scaled width and the corresponding determined height.

21. A method according to claim 20, wherein step (iv) comprises using the scaled width and a shape rule for the corresponding object to determine the corresponding height.

22. A method according to claim 1, wherein each said panel has an actual width and height and contains a plurality of the objects arranged horizontally therein, said method further comprising the steps of:
(a) dividing an actual width of the panel between the objects such that each object has the same actual width;
(b) calculating an actual height of each said object according to a shape rule of the object, to a maximum height of the panel; and
(d) placing each object into the panel according to the calculated actual height and the corresponding determined width.

23. A method according to claim 1, further comprising:
determining actual dimensions of a plurality of objects to be arranged within at least one panel that has been laid out on a page, each said panel having an actual width and height and containing a plurality of objects arranged horizontally therein, said determining comprising:
(a) selecting a content size rule for the panel in which the size of an object depends on scaling the plurality of objects in the panel by a common ratio, and
(b) setting an initial width of each said object to correspond to a preferred width of the object;
(c) where the sum of the widths is greater than a width of the panel, scaling a size of each said object by said common ratio until a sum of the widths of the objects corresponds with the width of the panel; and
(d) placing each object into the panel according to the scaled size.

24. A method according to claim 23, wherein each object has an associated minimum width, the determining further comprising: (i) calculating the total actual width of all the objects in the panel; (ii) increasing the actual width of each object in the panel having an actual width less than the associated minimum width, such that the actual width of the object is at least the associated minimum width, (iii) decreasing the actual width of each other object in the panel such that the total actual width of all the objects in the panel is equal to the total width calculated in step (i).

25. A method according to claim 1, wherein at least one said object has a height and a width, said method further comprising the steps of:
　establishing first and second values for a size of said object in one of the height and width dimensions of said object;
　grading a unit proportionality scale between said first and second values in said one dimension; and
　modifying a size of said object at least in said one dimension according to a shape rule having a proportionality value greater than 0.0 and less than 1.0 on said unit proportionality scale.

26. A computer apparatus for laying out objects on a page, each said object having a preferred height and a preferred width, said apparatus comprising:
　means for arranging a first plurality of said objects within a first panel according to a first arrangement rule;
　means for calculating a preferred width and height of the first panel, based on the preferred width of at least one of the first plurality of said objects;
　means for arranging a second plurality of said objects within a second panel according to a second arrangement rule;
　means for calculating a the preferred width and height of the second panel, based on the preferred height of at least one of the second plurality of said objects;
　means for laying out the first and second panels within the page, thereby determining an actual width and height of each of the first and second panels based on the preferred heights and widths of both the first and second panels; and
　means for laying out (i) the first plurality of said objects within the first panel thereby determining an actual width and height of each of the first plurality of said objects based on the determined actual width and height of the first panel and the arrangement rule within the first panel and (ii) the second plurality of said objects within the second panel thereby determining an actual width and height of each of the second plurality of said objects based on the determined actual width and height of the second panel and the arrangement rule within the second panel.

27. A non-transitory computer readable storage medium having a computer program recorded thereon, the program being executable by a computerized variable data printing system to lay out objects on a page, each said object having a preferred height and a preferred width, said program comprising:
　code for arranging a first plurality of said objects within a first panel according to a first arrangement rule;
　code for calculating a preferred width and height of the first panel, based on the preferred width of at least one of the first plurality of said objects;
　code for arranging a second plurality of said objects within a second panel according to a second arrangement rule;
　code for calculating a preferred width and height of the second panel, based on the preferred height of at least one of the second plurality of said objects;
　code for laying out the first and second panels within the page, thereby determining an actual width and height of each of the first and second panels based on the preferred heights and widths of both the first and second panels; and
　code for laying out (i) the first plurality of said objects within the first panel thereby determining the actual width and height of each of the first plurality of said objects based on the determined actual width and height of the first panel and the arrangement rule within the first panel and (ii) the second plurality of said objects within the second panel thereby determining an actual width and height of each of the second plurality of said objects based on the determined actual width and height of the second panel and the arrangement rule within the second panel.

* * * * *